United States Patent [19]
Crespo et al.

[11] Patent Number: 5,175,743
[45] Date of Patent: Dec. 29, 1992

[54] SPREAD-TIME CODE DIVISION MULTIPLE ACCESS TECHNIQUE WITH ARBITRARY SPECTRAL SHAPING

[75] Inventors: Pedro M. Crespo, Madrid, Spain; Michael L. Honig, Montclair, N.J.; Jawad A. Salehi, Bedminster, N.J.

[73] Assignee: Bell Communications Research, Inc., Livingston, N.J.

[21] Appl. No.: 796,642

[22] Filed: Nov. 22, 1991

[51] Int. Cl.⁵ .................. H04B 14/02; H04B 15/00; H04J 9/00
[52] U.S. Cl. .......................... 375/1; 370/18; 370/19
[58] Field of Search ............... 375/1; 370/18, 19, 21, 370/23

[56] References Cited

U.S. PATENT DOCUMENTS

| | | | |
|---|---|---|---|
| 4,313,197 | 1/1982 | Maxemchuk | 370/23 X |
| 4,779,266 | 10/1988 | Chung et al. | 370/93 |
| 5,029,184 | 7/1991 | Andren et al. | 375/1 |
| 5,068,874 | 11/1991 | Leitch | 375/51 |

OTHER PUBLICATIONS

"Spread Spectrum For Commercial Communications," D. L. Schilling et al., IEEE Communications Magazine., vol. 29, No. 4, pp. 66–79, Apr. 1991.

"Coherent Ultrashort Light Pulse Code–Division Multiple Access Communications Systems," J. A. Salehi et al., Journal on Lightwave Technology, vol. 8, No. 3, pp. 478–491, Mar. 1990.

"Surface Acoustic Wave Devices", L. B. Milstein et al., IEEE Communications Magazine, pp. 25–33 Sep. 1979.

Primary Examiner—Gilberto Barrón, Jr.
Attorney, Agent, or Firm—Leonard Charles Suchyta; John T. Peoples

[57] ABSTRACT

A spread-time code division multiple access (ST-CDMA) technique is disclosed for bandlimited access to a channel. With ST-CDMA, pseudo-random (PN) sequences are assigned to each transmitter in the multi-transmitter system, and the Fourier transform of the transmitter pulse for a given transmitter is determined by modulating the phase of the desired transmitter spectrum by the PN sequence assigned to the transmitter. The data symbols produced by the transmitter are conveyed by delayed versions of the transmitter pulse. The transmitted data for a particular transmitter is recovered at a receiver synchronized to the transmitter by sampling the output of a filter matched to the corresponding transmitter pulse.

10 Claims, 6 Drawing Sheets

SPREAD-TIME CODE DIVISION MULTIPLE ACCESS TECHNIQUE WITH ARBITRARY SPECTRAL SHAPING

FIELD OF THE INVENTION

This invention relates generally to multi-user digital data transmission over bandlimited channels and, more particularly, to code division multiple access to the bandlimited channels.

BACKGROUND OF THE INVENTION

The potential demand for ubiquitous wireless communications combined with restricted availability of the radio frequency spectrum has motivated intense research into bandwidth efficient multiple access schemes. A recent reference entitled "Spread Spectrum for Commercial Communications", by Schilling et al, as published in *IEEE Communications Magazine*, Vol. 29, No. 4, April 1991 discusses one avenue of approach, namely, Spread Spectrum Code Division Multiple Access (SS-CDMA) techniques, to effect multiple access communication.

Conventional CDMA techniques take advantage of available bandwidth on the transmission medium, such as a fiber optic cable or the radio spectrum, by generating a set of pulses in the time domain which have appropriate correlation properties over predetermined time periods. Typically, the correlation property is such that a particular receiver tuned to a given transmitter code produces a detectable signal whenever the given transmitter code is presented to the receiver during each time period, whereas the output of the receiver is near zero for any other transmitter code presented to the receiver. A CDMA system operating on this time domain correlation property and utilizing a set of codes designated the optimal orthogonal codes was disclosed in U.S. Pat. No. 4,779,266.

In the article entitled "Coherent Ultrashort Light Pulse Code-Division Multiple Access Communication Systems", appearing in the *Journal of Lightwave Technology*, by J. A. Salehi, A. M. Weiner, and J. P. Heritage, March, 1990, Vol. 8, No. 3, a technician for encoding a sequence of ultrashort pulses for transmission over an optical channel is disclosed. The encoding is effected by modulating the phase characteristic of the Fourier transform of a stream of ultrashort light pulses corresponding to a sequence of data symbols. Each transmitter is assigned a unique code to modulate its corresponding stream, and a receiver tuned to that unique code can detect the data symbols impressed on the short pulses by the associated transmitter. As disclosed, encoding is accomplished, at optical frequencies, by an arrangement of grating elements and a multielement phase modulator.

There is no teaching or suggestion in the art of any technique to generate a transmitter pulse which is power limited and which must match to a channel having bandwidth restrictions, additive noise, and a frequency transfer response characterized by loss and distortion. An example of such a channel is one which supports transmission only on disconnected frequency bands.

SUMMARY OF THE INVENTION

These shortcomings and other limitations are obviated, in accordance with the present invention, by assigning a unique code to each transmitter, and then by utilizing the unique code to encode the frequency domain characteristic of a transmitter pulse which is selected to maximize the overall signal-to-interference ratio at a corresponding receiver based on the characteristics of the channel interconnecting the transmitter-receiver pair and additive channel noise.

Broadly speaking, the transmitter from a synchronized transmitter-receiver pair propagates, over an interconnecting channel, a transmitted time signal formed with reference to a transmitter pulse. The frequency domain characteristic of the transmitter pulse—designated the transmitter characteristic—has both magnitude and phase components in the frequency domain. The frequency domain characteristic of the channel—designated the channel transfer characteristic—also has magnitude and phase components in the frequency domain. Given a power constraint on the transmitter pulse and given an additive white noise on the channel, the channel characteristic determines the optimized transmitter spectrum (i.e., the square of the magnitude of the frequency domain characteristic of the transmitter pulse) which maximizes the signal-to-interference (SIR) ratio at the receiver. The transmitter magnitude, as determined from the spectrum, is modulated by a complex frequency function having modulus one so that the resultant overall spectrum of the modulated characteristic and the optimized transmitter spectrum are equivalent. The transmitter code is encoded into this phase component so that the transmitter characteristic can be uniquely identified at the corresponding receiver. In particular, each transmitter is assigned a pseudo-random or pseudo-noise (PN) sequence, that is, the phase component of the complex function can be a square wave determined by a PN complex-valued sequence. An intermediate time signal is generated by taking the inverse Fourier Transform of the frequency domain characteristic obtained by multiplying the transmitter magnitude by the complex function. This intermediate signal is limited in time by truncating it via time-windowing. The truncated output is the transmitter pulse, and is the unique time signal associated with the given transmitter. Finally, to transmit the actual data information produced by a data source associated with each transmitter, periodically delayed versions of the transmitter pulse are pulse amplitude modulated by the actual data information to form the input to the channel, that is, the transmitted time signal. The delay is the symbol rate.

Broadly, at the receiver, which is synchronized with its corresponding transmitter via a conventional synchronization technique, the output time signal from the channel is time windowed at predetermined time intervals. The windowed time signal is partitioned into a sequence of contiguous time segments, and each of the time segments is processed by taking its Fourier transform to obtain a transformed spectrum. This transformed spectrum is then modulated by a frequency domain signal which is the product of: the transmitter magnitude; the conjugate of the complex frequency function; and the conjugate of the channel characteristic. The modulator output is processed by a correlation detector to generate estimates of the data symbols.

This technique of generating the transmitter pulse to match a desired spectrum is called spread time CDMA. The spread time technique has the advantage of increasing the flexibility with which power-limited pulses can be designed with particular spectral characteristics. For example, the transmitter spectrum can have support on disconnected frequency bands, which is relatively difficult to achieve by shaping the transmitted time signal in spread spectrum systems.

The organization and operation of this invention will be understood from a consideration of the detailed description of the illustrative embodiment, which follows, when taken in conjunction with the accompanying drawing.

DETAILED DESCRIPTION

Overview of Conventional CDMA

Multiplexing in conventional spread-spectrum CDMA (SS-CDMA) is achieved by assigning a different code, or signature sequence, to each transmitter. Each transmitter uses this code to generate a time signal that can be decoded at a corresponding receiver. To generate a SS-CDMA channel signal, a time-domain transmitter signal $r_i(t)$, typically a single square pulse of width T, is multiplied by a pseudo-random PN sequence in the time domain. Specifically, it is assumed that the transmitted time signal for the $i^{th}$ transmitter is of the form $$s_i(t) = \sum_k b_k^{(i)} r_i(t - kT) \quad (1)$$

where $\{b_k^{(i)}\}$ are the actual information symbols produced by transmitter i, $r_i(t)$ is the transmitted baseband time signal assigned to the $i^{th}$ transmitter, and $1/T$ is the symbol rate. Binary signaling is assumed to apply, i.e., $b_k^{(i)} \in \{\pm 1\}$. It is desired that the signals $r_i(t)$, $i = 1, \ldots, K$, where K is the number of transmitters, be nearly orthogonal for all time shifts, that is, $$\left| \int_0^T r_i(t) s_l(t - \tau) dt \right| < \epsilon \quad (2)$$

for all $l \neq i$ and $\tau$, where $\epsilon$ is some suitably small constant. In this case the intended receiver can recover the data from its corresponding transmitter in the presence of interferers by sampling the output of a filter matched to $r_i(t)$.

Transmitter of the Present Invention

Figure 1:
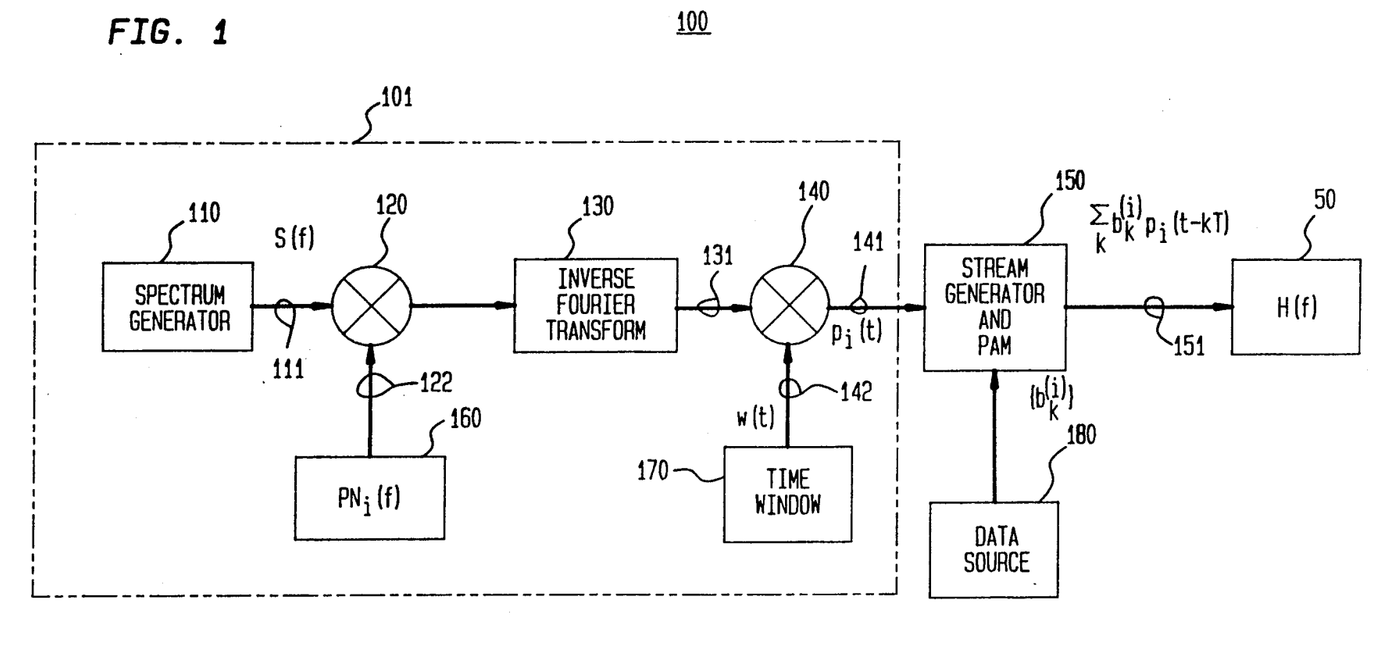
FIG. 1 depicts a block diagram of the transmitter, including the spectral encoder, to encode a transmitter pulse with a pseudo-noise sequence.

With reference to FIG. 1, there is shown spread-time CDMA (ST-CDMA) transmitter 100 in accordance with the present invention. Transmitter 100 for the $i^{th}$ transmitter includes a serial arrangement of: spectrum generator 110; multiplier 120; inverse Fourier transform device 130; multiplier 140; and pulse amplitude modulator 150. The output from multiplier 140, on lead 141, is a transmitter pulse $p_i(t)$. The output from stream generator and pulse amplitude modulator (PAM) device 150, on lead 151, is the transmitted time signal $$s_i(t) = \sum_k b_k^{(i)} p_i(t - kT) \quad (3)$$

produced by modulating delayed versions of the transmitter pulse with data symbols provided by data source 180. Accordingly, device 150 effects generation of a stream of delayed versions of $p_i(t)$. The transmitted time signal on lead 151 serves as the input to channel 50; channel 50 has a frequency domain characteristic designated H (f). Equation (3) is the ST-CDMA equivalent to equation (1) for SS-CDMA.

To generate $p_i(t)$ in accordance with one illustrative embodiment, spectrum generator 110 produces a frequency characteristic, designated S (f), on lead 111. The technique for determining the S (f) to be produced by generator 110 is discussed in detail below. Multiplier 120 has as its second input, on lead 122, a signal designated $PN_i(f)$, that is, a frequency domain pseudo-noise function. Multiplier 140 has as its second input, on lead 142, a signal designated w (t), that is, a time domain window signal. If, illustratively, $PN_i(f)$ is a complex frequency function which has modulus one, and w (t) is of the form w (t) = 1 over a time interval of interest, then the square of the magnitude of the frequency domain characteristic emitted from multiplier 140 is $|S(f)|^2$. The square of the magnitude of the frequency domain characteristic of any time domain signal is generally referred to as the spectrum or the spectral density. Accordingly, by way of terminology, the arrangement of elements 110-140, 160, and 170 is called the transmitter spectral encoder 101, that is, this spectral encoder 101 generates the transmitter pulse $p_i(t)$.

Figure 2:
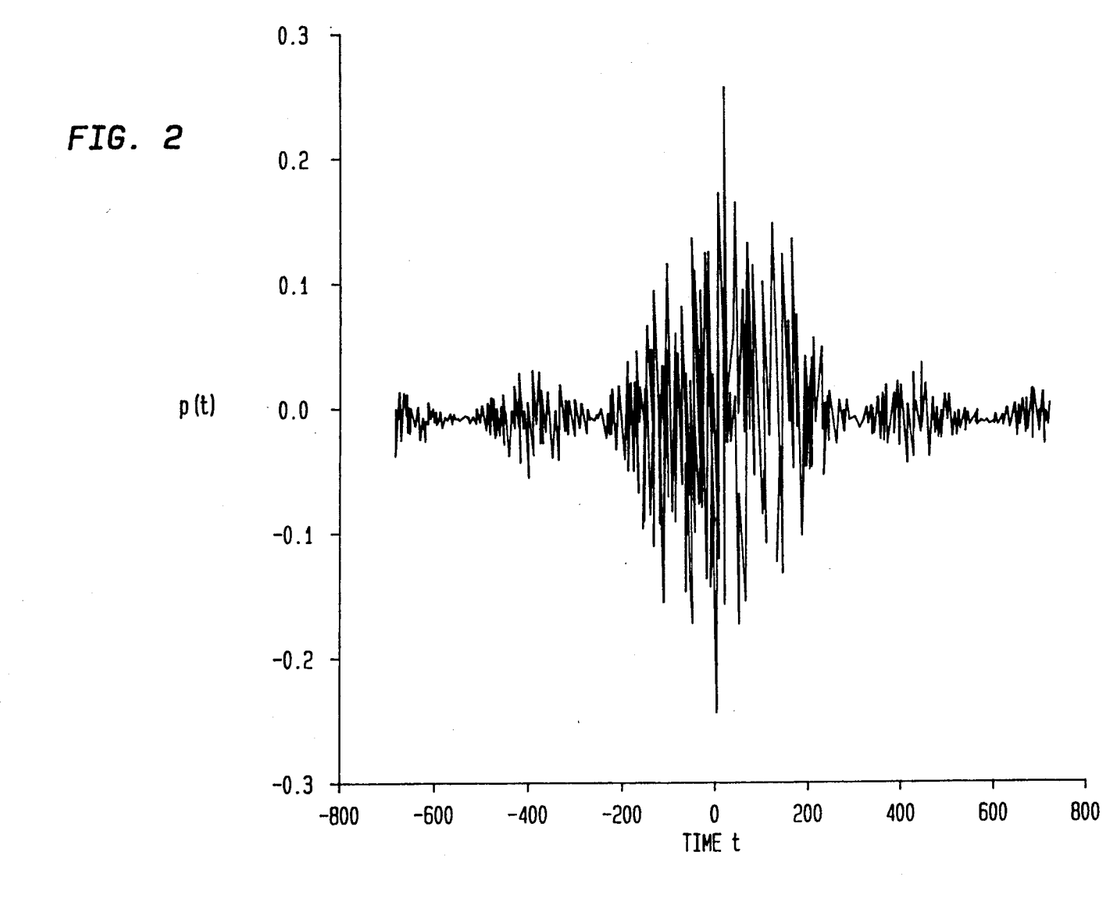
FIG. 2 is an exemplary transmitter pulse for a uniform transmitter characteristic modulated by a complex function having a pseudo-noise phase characteristic.

The code assigned to source 160, which modulates S (f), can be a complex-valued PN-sequence, generally of the form $$PN_i(f) = \sum_{i=-M/2}^{(M/2)-1} a_{i,q}(f - if_c), \quad (4)$$

where q (f) is a short pulse in the frequency domain of width $f_c$. There are a total of M pulses, and the bandwidth of $PN_i(f)$ is $Mf_c$. As an example, q (f) can be a rectangular pulse (as will be employed to generate FIG. 2); however, other pulse shapes for q (f) can be used to better confine the energy of the transmitter pulse to the symbol intervals. For instance, to obtain one exemplary PN sequence, each sequence element can be chosen from a set of uniformly spaced points on the unit circle in the complex plane. Assuming the intended receiver is properly synchronized with its corresponding transmitter via conventional synchronization techniques, then demodulation by the "conjugate" code, in which each PN-sequence element is replaced by its conjugate, enables detection of the transmitted data sequence. If, however, the decoder is matched to a different PN-sequence, then the output signal from the given receiver is additive low-intensity interference. Details of decoding will be presented shortly.

An example of a ST-CDMA transmitter pulse obtained from a S (f) which is constant over the normalized frequency interval $[-\frac{1}{2}, \frac{1}{2}]$ is shown in FIG. 2. The random sequence used to modulate the spectrum has length 256. Only 128 sequence elements are chosen randomly, however, since this random sequence and its conjugate modulate the positive and negative halves of S (f), respectively. This guarantees that $p_i(t)$ is real-valued. The sequence elements $a_k$, $k=0, \ldots, 127$, are randomly chosen from the set $\{1, e^{j\pi/2}, -1, e^{-j\pi/2}\}$. It is easily verified that this transmitter pulse is given by $$p(t) = \frac{\sin \pi f_c t}{\pi t} \sum_{k=-M/2}^{M/2-1} a_k e^{j2\pi f_c(k-\frac{1}{2})t}. \tag{5}$$

where $M=256$, and $f_c=1/M$. It is noted that p (t) is of infinite duration, and therefore in a practical implementation must be truncated in time by a time window such as device 170 of FIG. 1. In FIG. 1, the signal appearing on lead 131, which corresponds to p (t) of infinite duration, is designated the intermediate time signal.

The inverse Fourier transform operation performed by device 130 in spectral encoder 101 may be implemented in a straightforward manner by conventional surface acoustic wave (SA W) chirp filters. The reference entitled "Surface Acoustic Wave Devices", published in the *IEEE Communications Magazine* by Milstein and Das, pages 25-33, September, 1979 discusses such conventional implementations.

Figure 3:
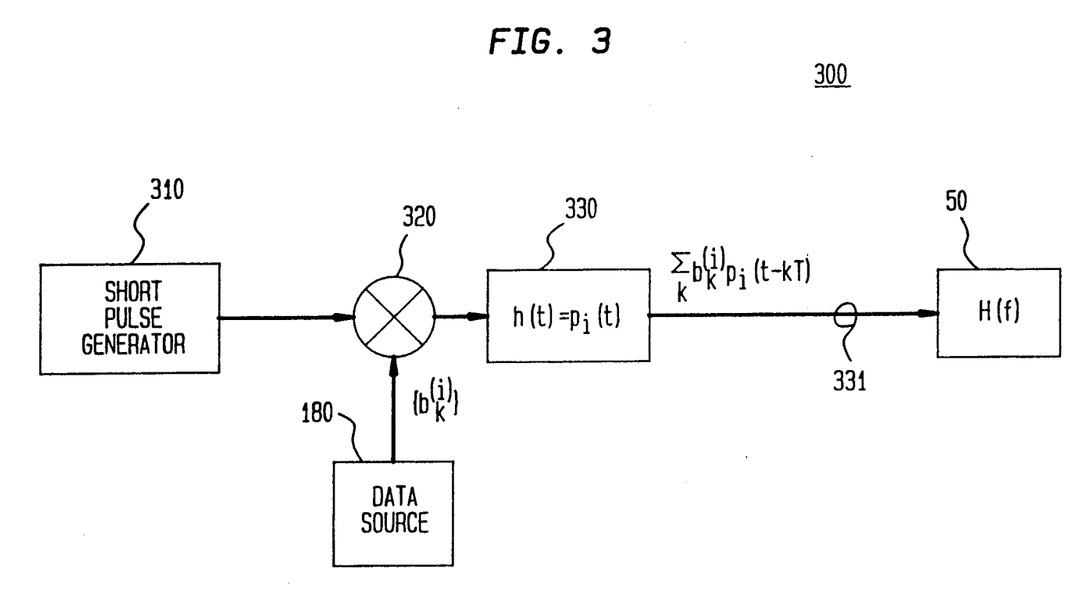
FIG. 3 is an alternative transmitter to produce a transmitted time signal.

A second embodiment to implement transmitter 100, as shown in FIG. 3, is to precompute $p_i(t)$, as guided by the circuitry and concomitant operations depicted by spectral encoder 101 of FIG. 1, and then synthesize filter 330 of FIG. 3 having $p_i(t)$ as the impulse response. The transmitted time signal, on lead 331, is then the output of this filter in response to a series of short pulses produced at the rate 1/T by short pulse generator 310, as modulated in modulator 320 by data symbols produced by data source 180. These short pulses (which ideally are a series of delta functions) are "spread" in time by such a spectral encoder (hence the origin of the name "spread-time CDMA").

Receiver of the Present Invention

Figure 4:
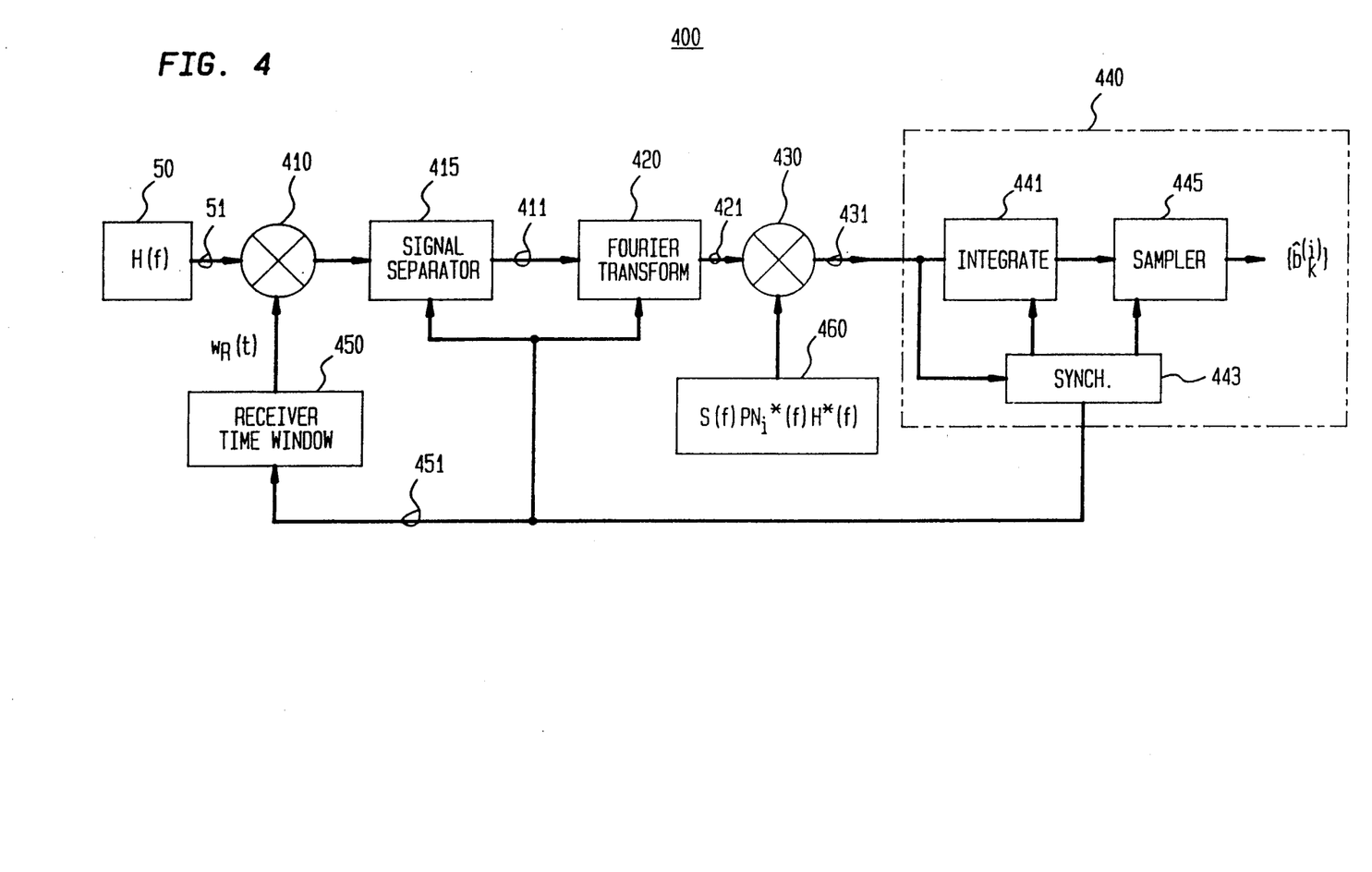
FIG. 4 depicts a block diagram of the receiver, including the spectral decoder, for a synchronized transmitter-receiver pair.

ST-CDMA receiver 400, or "spectral" decoder, shown in FIG. 4 includes the serial combination of: receiver multiplier 410; Fourier transformer 420; conjugate modulator 430; and detector 440. The incoming channel signal to be processed is received from channel 50 over lead 51. In order to restrict signals in the time domain, the incoming channel signal is multiplied, via multiplier 410, by a receiver time window signal $w_R(t)$ provided by device 450, and then delivered to signal separator 415. In effect, the incoming channel signal is partitioned by the combination of multiplier 410, window 450, and separator 415 into a sequence of time signals wherein each partitioned time signal is of duration T', where $T' \geq T$. (Ideally, T' is the duration of the transmitter pulse). Synchronization for this partitioning is received by window 450 from detector 440 over lead 451. Each partitioned time signal is delivered to Fourier transform device 420 from separator 415 via lead 411. Each of these partitioned time signals is converted, one at a time, to a frequency domain representation by Fourier transformer 420 to produce a frequency domain representation—designated the received characteristic—for each partitioned time signal. During the conversion, because of the partitioning, each time signal only has values in an interval of duration T' and is zero elsewhere. The received frequency characteristic on lead 421 in response to each transmitted pulse $b_k^{(i)}p_i(t)$ is $b_k^{(i)}S(f)H(f)PN_i(f)$ (ignoring the effect of $w_R(t)$). To prepare the received characteristic for detection within detector 440, the received characteristic is multiplied in multiplier 430 by: frequency characteristic S(f); the conjugate of the pseudo-noise source $PN_i(f)$, i.e., $PN_i^*(f)$; and the conjugate to the channel characteristic H(f), i.e., $H^*(f)$. Then, the frequency characteristic on lead 431 is $b_k^{(i)}|S(f)|^2|H(f)|^2$. Integrator 441 then integrates the characteristic on lead 431 over the bandwidth for which $S(f)>0$. Since $|S(f)H(f)|^2 \geq 0$ for all frequencies, sampler 445 decides if $\hat{b}_k^{(i)}=1(-1)$ whenever the integration is positive (negative). Synchronization of a transmitter-receiver pair is accomplished via element 443 in any conventional, well-known manner. The synchronization signal is provided to integrator 441, sampler 445, receiver time window 450, separator 415 and Fourier transformer 420. Fourier transformer 420 may also be implemented with a surface acoustic wave device as set forth in the aforementioned article by Milstein and Das.

Figure 5:
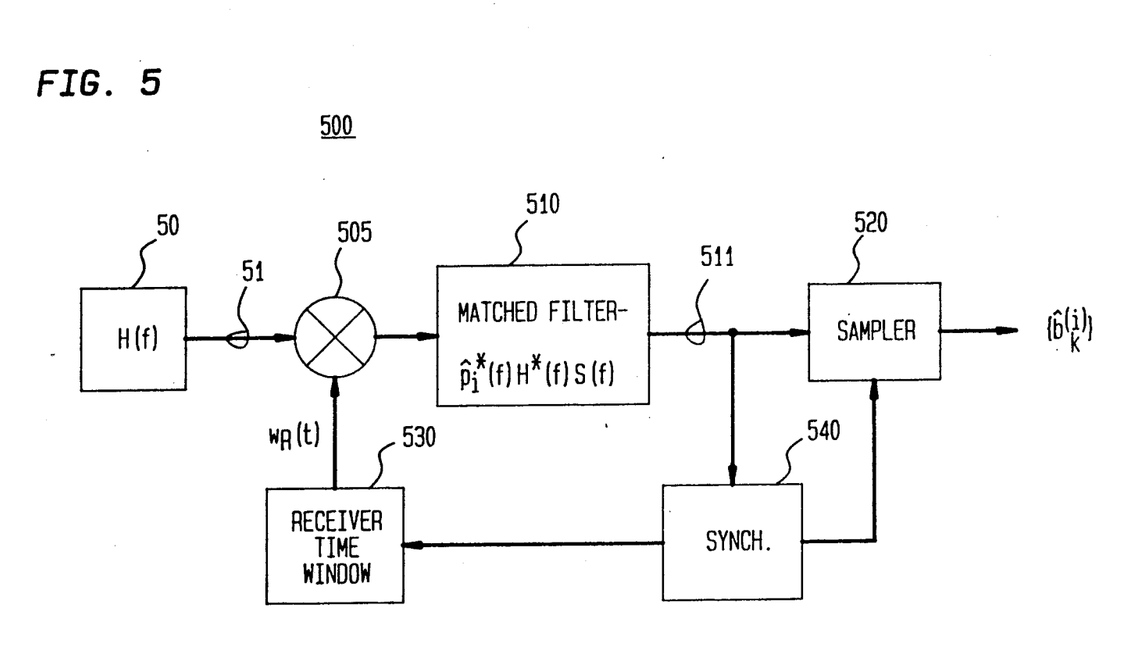
FIG. 5 is an alternative receiver explicitly of the matched-filter type.

The arrangement depicted in FIG. 5 is an alternative embodiment to receiver 500 realized by matched filter 510. In this arrangement, filter 510 has a frequency domain characteristic given by the product of: (a) the conjugate of the Fourier transform of the transmitter pulse, that is, $\hat{p}_i^*(f)$ where $\hat{p}_i(f)$ is the Fourier transform of $p_i(t)$; and (b) $H^*(f)S(f)$. The output of filter 510, appearing on lead 511, is sampled by sampler 520 to produce the estimates $\{\hat{b}_k^{(i)}\}$. Multiplier 505, receiver time window 530, and synchronization device 540 are counterparts to elements 410, 450 and 443 in FIG. 4.

Generating the Transmitter Magnitude S(f)

It can be shown that the SIR—the ratio of received signal power to received interference power at the output of integrator 441 of FIG. 4—is a functional of the square of the magnitude of the transmitter characteristic, that is, the spectrum of the transmitter pulse. Thus, the spectrum that maximizes the SIR subject to an average transmitted power constraint can be determined. It is required to $$\max_{s(f)} SIR$$

subject to $$\int_{-W}^{W} |S(f)|^2 df = 1, \tag{6}$$

where is assumed that $|S(f)|=0$ for $|f| > W$. The SIR can be computed, and a standard variational argument shows that the optimal spectrum is given by $$|S(f)|^2 = \begin{cases} \frac{c_1}{|H(f)|^2}\left(1 - \frac{c_2}{|H(f)|^2}\right) & \text{if } |H(f)|^2 > c_2 \\ 0, & \text{if } |H(f)|^2 \leq c_2 \end{cases} \tag{7}$$

where $$c_1 = \frac{1 + \alpha I}{1 + \alpha(I^2 - \mu J)}, \quad c_2 = \frac{\alpha \mu}{1 + \alpha I}, \tag{8}$$

-continued $$I = \int_{B(f)} \frac{1}{|H(f)|^2} df, \quad J = \int_{B(f)} \frac{1}{|H(f)|^4} df. \quad (9)$$

$$B(f) = \{f: |H(f)|^2 > c_2\}. \quad (10)$$

$\alpha = (N_0 T)/[4M(K-1)]$, and $\mu = \text{meas } B(f)$, that is, the range of frequencies over which $S(f) > 0$. Also, $N_0/2$ is the variance of the white noise, K is the number of transmitters, and M is the length of the PN sequence assigned to each transmitter. It is noted that $c_1$ is simply a normalization constant that enforces the constraint of equation (6).

When the additive channel noise is small, i.e., if $N_0/2 \to 0$, then $c_2 \to 0$ and $$|S(f)|^2 \approx \frac{c_1}{|H(f)|^2} \quad (11)$$

for all f such that $|H(f)|^2 >> c_2$.

EXAMPLE 1

To demonstrate the principles of the present invention with respect to a specific example, it is supposed that $|H(f)| = 1$ for $|f| < W$. In this example $$c_2 = \frac{2\alpha W}{1 + 2W\alpha} < 1 \quad (12)$$

so that from equation (10), $B(f) = \{f: |f| < W\}$. In this case $c_1 = (1 + 2W\alpha)/2W$, and it is easily verified that $$|S(f)|^2 = \begin{cases} 1/(2W) & \text{for } |f| < W \\ 0 & \text{for } |f| > W. \end{cases} \quad (13)$$

The SIR in this case can be computed as $SIR^2 = 2WT/[(K-1) + N_0T/(2M)]$. The plot of FIG. 2 already depicted one transmitter pulse for a transmitter magnitude S(f) which was constant over a frequency band, as is this present case.

EXAMPLE 2

As a second example, it is assumed that the channel impulse response is $h(t) = e^{-t}$, or $|H(f)|^2 = 1/(1 + 4\pi^2 f^2)$. $|H(f)|^2 > c_2$ when $$|f| < f_0 = \frac{1}{2\pi}\left(\frac{1}{c_2} - 1\right)^{\frac{1}{2}}, \quad (14)$$

so that from equation (10), $\mu = \text{meas } B(f) = 2f_0$. From equations (8) and (9), it follows that $$c_2 = \frac{[2\alpha/(3\pi)]^{2/3}}{1 + [2\alpha/(3\pi)]^{2/3}}. \quad (15)$$

As $N_0/2$ increases from zero to infinity, $c_2$ therefore increases from zero to $$\sup_f |H(f)|^2 = 1.$$

Figure 6:
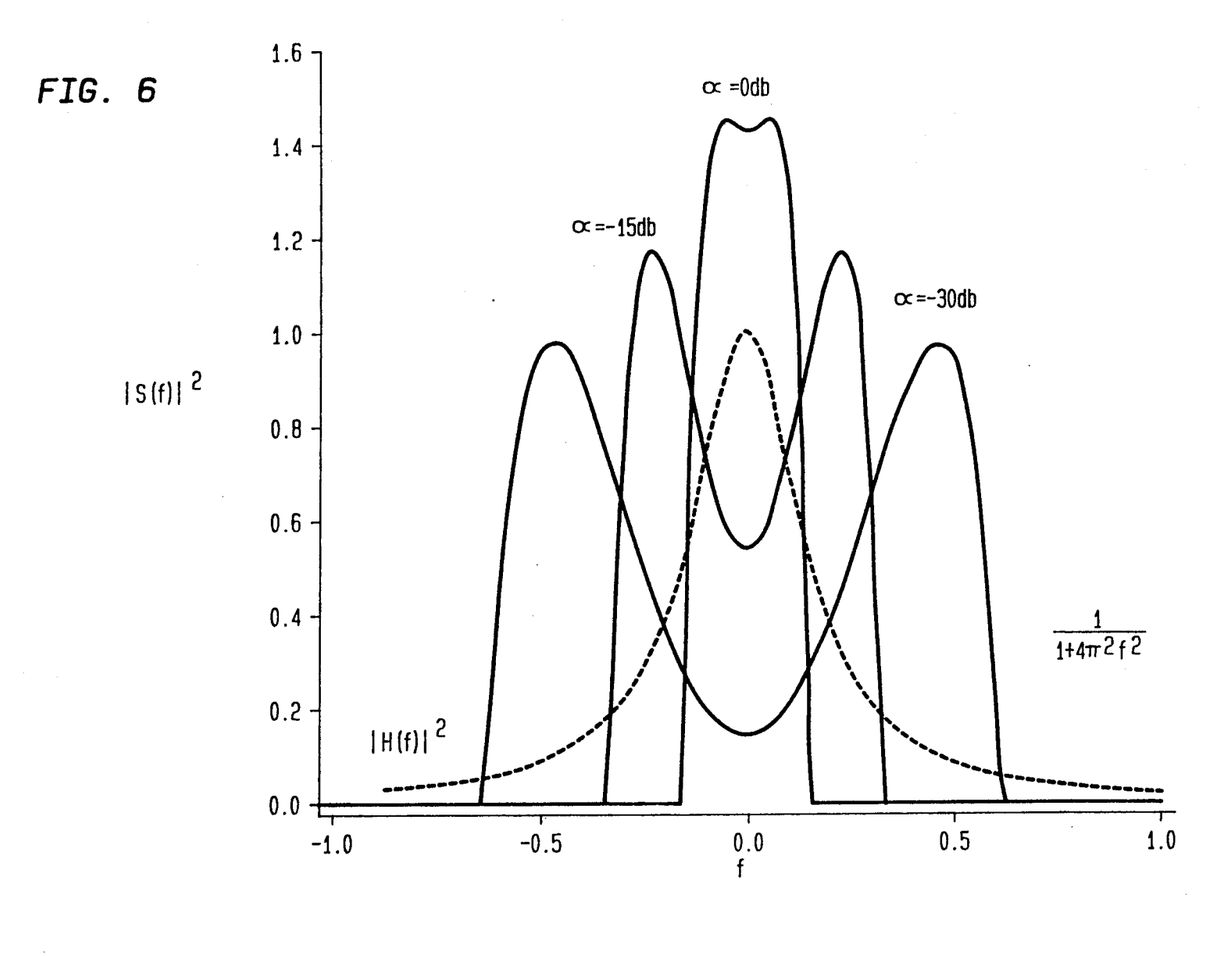
FIG. 6 is a plot of optimized transmitted spectra for an exemplary channel characteristic.

A plot of optimized transmitted spectra $|S(f)|^2$ for different values of $\alpha$ is shown in FIG. 6. Spectrum generator 110 of FIG. 1 can then generate the appropriate S(f) once a given $\alpha$ is selected.

EXAMPLE 3

As a final, qualitative example, it is supposed that H(f) is composed of two ideal bandpass channels each having bandwidth W with respective support on disconnected or separate frequency bands. Since H(f) is even, the total available channel bandwidth is 4W. The transmitter pulse can be matched to this channel, which results in essentially the same performance as for the case of an ideal bandlimited channel with bandwidth 4W. Then $SIR = [4WT/(K-1)]^{\frac{1}{2}}$ in the absence of background noise. In contrast, a conventional spread-spectrum system would most likely treat this channel as two independent channels each having bandwidth 2W. An additional channel assignment scheme is then needed to assign users to one of the two independent bandpass channels.

It is to be understood that the above-described embodiments are simply illustrative of the application of the principles in accordance with the present invention. Other embodiments may be readily devised by those skilled in the art which may embody the principles in spirit and scope. Thus, it is to be further understood that the methodology and concomitant circuitry described herein is not limited to the specific forms shown by way of illustration, but may assume other embodiments limited by the scope of the appended claims.

What is claimed is:

1. Circuitry in a transmitter for spectrally encoding a transmitter pulse for communication over a channel to a receiver, the channel having a given frequency domain characteristic and noise interference, the frequency domain characteristic and noise interference determining a transmitter frequency magnitude which maximizes the signal-to-interference ratio at the receiver for a power constraint on the transmitter pulse, the circuitry comprising means for modulating the transmitter frequency magnitude with a complex frequency function having unit modulus and a phase function determined by a pseudo-noise sequence to produce an encoded modulated characteristic, and means for transforming said encoded modulated characteristic to produce a transformed signal representative of the transmitter pulse.

2. The circuitry as recited in claim 1 wherein said means for transforming includes means for generating an inverse Fourier transform.

3. The circuitry as recited in claim 2 wherein said means for generating an inverse Fourier transform includes a surface acoustic wave device.

4. Circuitry in a transmitter for spectrally encoding a transmitter pulse for communication over a channel to a receiver, the channel having a given frequency domain characteristic and noise interference, the circuitry comprising means for generating a transmitter frequency magnitude with reference to the frequency domain characteristic of the channel so as to maximize a signal-to-interference ratio at the receiver for a power constraint on the transmitter pulse, means for modulating said transmitter frequency magnitude with a complex frequency function having unit modulus and a phase function determined by a pseudo-noise sequence to produce an encoded modulated characteristic, and means for inverse Fourier transforming said encoded modulated characteristic to provide a transformed time signal corresponding to the transmitter pulse.

5. The circuitry as recited in claim 4 further including means for truncating said transformed time signal in the time domain, thereby generating the transmitter pulse.

6. The transmitter as recited in claim 5 further including a source of data symbols generated at a symbol rate and wherein the circuitry further comprises means for regenerating the transmitter pulse at the symbol rate to produce a stream of transmitter pulses, and means for modulating said stream of transmitter pulses with the data symbols to produce a transmitted time signal serving as an input to the channel.

7. The circuitry as recited in claim 6 wherein said means for inverse Fourier transforming includes a surface acoustic wave device.

8. A method for generating a spectrally encoded transmitter pulse in a transmitter for propagation over a channel to a receiver, the channel having a given frequency domain characteristic and noise interference, the method comprising the steps of generating a transmitter frequency magnitude with reference to the frequency domain characteristic of the channel so as to maximize a signal-to-interference ratio at the receiver for a power constraint on the transmitter pulse, modulating said transmitter frequency magnitude with a complex frequency function having unit modulus and a phase function determined by a pseudo-noise sequence to produce an encoded modulated characteristic, and transforming said encoded modulated characteristic to produce a transformed signal corresponding to the transmitter pulse.

9. The method as recited in claim 8 further including the step of truncating said transformed signal to produce the transmitter pulse.

10. The method as recited in claim 9 wherein said transmitter includes a source of data symbols generated at a symbol rate and the method further comprises the steps of regenerating the transmitter pulse at the symbol rate to produce a stream of transmitter pulses, and modulating said stream of transmitter pulses with the data symbols to produce a transmitted time signal serving as an input to the channel.

* * * * *